United States Patent Office 3,470,804
Patented Oct. 7, 1969

3,470,804
PHOTOGRAPHIC CAMERA
Heinz Waaske, Braunschweig-Runingen, Germany, assignor to Rollei-Werke Franke & Heidecke, Braunschweig, Germany, a firm of Germany
Filed May 26, 1966, Ser. No. 553,077
Claims priority, application Germany, June 4, 1965, R 40,800
Int. Cl. G03b 17/04
U.S. Cl. 95—39    7 Claims

ABSTRACT OF THE DISCLOSURE

A photographic camera has the diaphragm leaves and the shutter blades mounted on a lens tube which is retracted rearwardly for the sake of compactness when pictures are not being taken, and which is pulled forwardly when pictures are being taken. The master member or main driving member of the shutter blades is not mounted on the lens tube but is mounted on the camera body, and engages appropriate parts of the shutter blade driving mechanism on the lens tube, only when the lens tube is in its forward position for picture taking. Interlocks prevent actuation of the shutter release member or trigger except when the lens tube is in proper position for picture taking.

---

This invention relates to a photographic camera, and more particularly to a still camera of the type in which the diaphragm, the shutter, and the lens are mounted in a tube which is pulled axially forwardly to position these parts for picture taking, and is moved axially rearwardly to make the camera more compact when pictures are not being taken.

Cameras of this type are well known in the art, and the present disclosure presupposes that the reader is already familiar with such cameras, so that the disclosure of the present application can be confined to the novel features, without giving details of construction which are already well known.

An object of the invention is the provision of a generally improved and more satisfactory camera of the type above mentioned.

Another object is the provision of an improved camera in which the shutter driving means and the diaphragm aperture control means are mounted in a stationary position on the camera body, and cooperate with the shutter and the diaphragm mounted in the tube, when the tube is moved forwardly to its effective picture-taking position.

Still another object is the provision of particularly simple and effective mechanism for coupling the shutter and diaphragm in the tube, to the respective driving or controlling parts on the camera body, when the tube is in picture-taking position.

A further object is the provision of simple latch means for latching the parts in proper position so as to prevent improper actuation and to make the camera substantially fool-proof.

These and other desirable objects may be attained in the manner disclosed as an illustrative embodiment of the invention in the following description and in the accompanying drawings forming a part hereof, in which.

Figure 1:
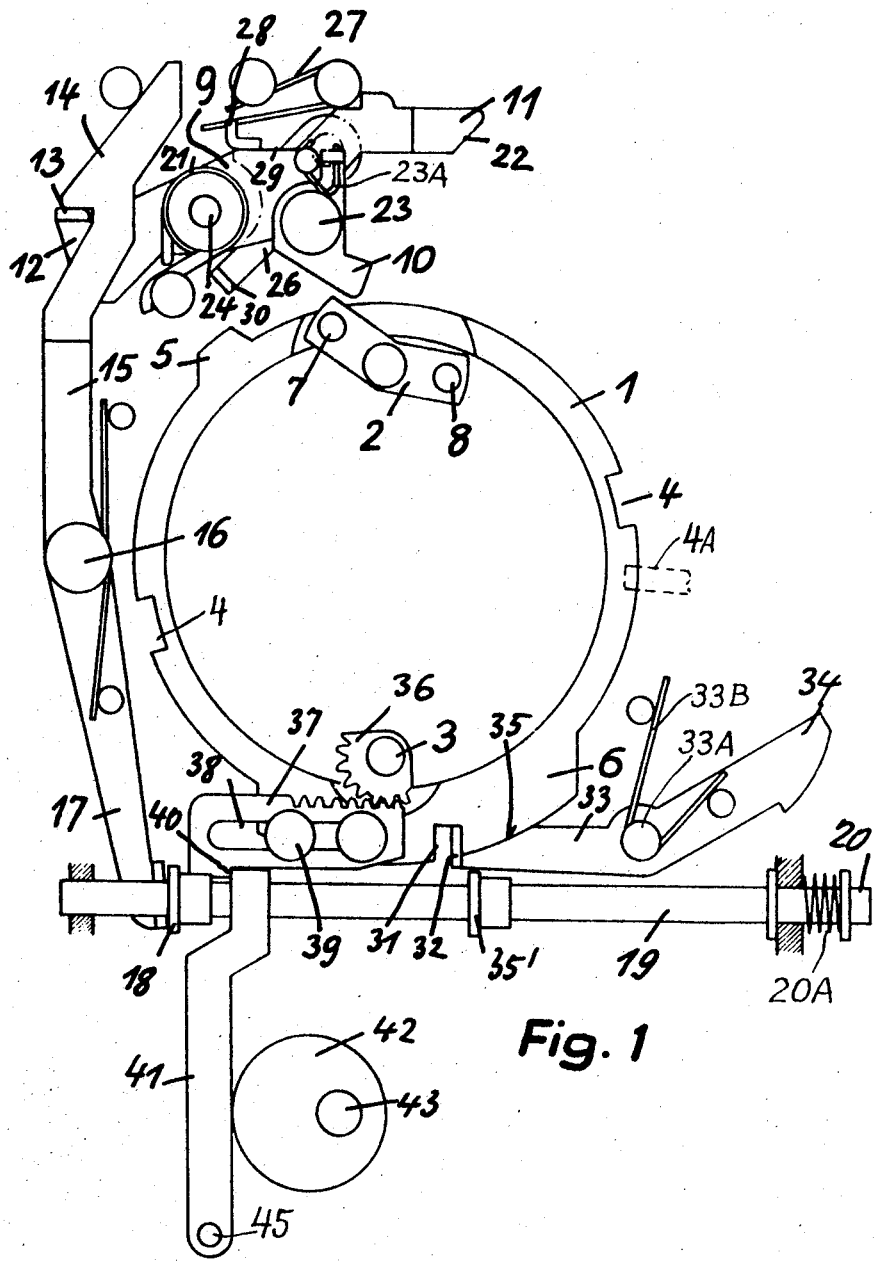
FIGURE 1 is a schematic view showing the parts in position ready for exposure.

The tube is schematically shown at 1, and is rotatable to a limited extent about its central axis. As above indicated, the lens, the shutter, and the diaphragm are mounted in this tube, whereas the shutter driving mechanism and the diaphragm aperture control mechanism are mounted in stationary position on the camera body and do not move axially with the tube when the tube is shifted from picture-taking position to retracted or ineffective position, or vice versa. The shutter blades themselves and the blade driving ring are conventional, and so are not illustrated in the drawings. It is sufficient to say that the blade driving ring is operatively connected to the pivoted blade lever 2 in such manner that when the lever 2 is in the position shown in FIG. 1, the shutter blades are closed, and when it is swung counterclockwise from the position shown in FIG. 1 to the position shown in FIG. 2, the blades are opened.

The diaphragm leaves are likewise conventional and so are not illustrated. It is sufficient to say that the leaves are operatively connected in known manner to the diaphragm driving member 3, so that when this member 3 is turned in one direction or the other, the diaphragm leaves are closed down from maximum aperture to minimum aperture, or opened up from minimum aperture to maximum aperture, as the case may be.

The tube 1 is formed with one or more longitudinal grooves 4, two such grooves preferably being provided at diametrically opposite points, as shown. Near the front and rear ends of the tube, the longitudinal grooves 4 merge into annular grooves extending circumferentially around the tube. Stationary lugs on the camera body cooperate with the grooves in such manner, well known in the art, that when the tube is twisted or turned to bring the longitudinal grooves 4 into alinement with the lugs, the tube may then be moved axially forwardly or rearwardly. But when the tube is moved to its forward limit of motion, which is the picture-taking position, it is then turned or twisted so that the stationary lugs are no longer in line with the longitudinal grooves 4 but are in the circumferential groove, thereby locking the tube in its desired axial position and preventing accidental rearward motion thereof. When it is desired to move the tube rearwardly to its retracted or collapsed position, it must first be turned or twisted to bring the longitudinal grooves 4 opposite the stationary lugs (one of which is schematically shown at 4A in FIG. 2) and then when the tube reaches its rearward limit position, it may again be turned or twisted slightly, to cause the lugs to enter the forward circumferential groove, thereby locking the tube in its rearward position against accidental forward movement until it is again twisted to permit it to be moved axially forwardly. Of course the feature of locking in the rearward position may be omitted if desired, it being sufficient in many cases to have the tube locked in the forward position only, by a twisting motion.

The previously mentioned shutter blade driving member 2 is a double armed lever having two driving pins 7 and 8 on its arms. These driving pins cooperate with the master member or main driving member of the shutter, which is shown in general at 9, when and only when the tube is in its effective picture-taking position. The master member is mounted on the camera body, rather than on the tube, and does not engage with the shutter driving member 2 when the tube is in its rear position.

The master member 9 has two driver lugs or arms 10 and 11, and is powered by a main driving spring or master spring 21 tending to swing the entire master member in a clockwise direction on its pivot 24. When the master member is in cocked or tensioned position, it is held in this position, until released, by an arm 12 forming part of the master member, having a bent over lug or ear 13 which engages behind a latch portion 14 on the double-armed release lever 15, pivoted on the camera body at 16. The other end 17 lies behind a collar 18 on a release plunger 19 which is mounted in the camera body for longitudinal movement. One end of the plunger forms a release button 20 accessible at the top, side, or other convenient portion of the camera body. A spring 20A tends to restore the plunger to its fully projecting position.

If the plunger 20 is depressed against the force of the spring 20A, the collar 18 will move the lever arm 17 and swing the latch 14 away from the ear 13 on the master member 9. The master member then runs down in a clockwise direction from its tensioned position to its rest position, under the influence of the master spring 21. During such running down movement, the first arm 10 on the master member engages the pin 7 on the shutter operating lever 2, and swings the lever 2 counterclockwise from the position shown in FIG. 1 to the position shown in FIG. 2, thereby opening the shutter blades. As the running down movement of the master member continues, the arm 10 on the master member slides off of the pin 7 and, at just about the same instant, the second arm 11 of the master member engages the other pin 8 on the lever 2, and the inclined cam end 22 of the arm 11 acts on the pin 8 to swing the blade operating lever 2 back in a clockwise direction from the position shown in FIG. 2 to the position shown in FIG. 1, thereby closing the shutter blades. Any suitable adjustable retarding mechanism or delaying mechanism of known form may be associated with the master member to retard the running down movement of the master member in order to provide exposures of different duration or speed.

In order that the master member may be tensioned or cocked, the first arm 10 is not solid but rather is a spring latch, pivoted on a stud 23 on the master member and urged by a spring 23A in a counterclockwise direction against a limit stop. Thus, as the master member 9 swings clockwise during a running-down movement, the arm 10 is unyielding when it makes contact with the pin 7, and causes the shutter blades to open. But when the master member is returned from its run-down position to its tensioned or cocked position, the arm 10 can yield on its pivot 23, against the force of the spring 23A, until it slips past the pin 7. The tensioning or cocking of the master member is performed in any conventional known way, the details of which are not important for purposes of the present invention. It may be performed either in conjunction with winding or advancing the film to bring the next exposure area or "frame" into exposure position, or may be entirely separate from the film winding operation, both ways of tensioning a master member being well known in the art.

There is a fixed stud 25 in the camera body, on which is pivotally mounted a lever 26 biased in a counterclockwise direction by a spring 27. A bent-over lug 28 on the lever 26 rides on a surface 29 of the master member 9, keeping the lug or ear 30 on the lever 26 in a position out of the range of any part of the tube 1, so long as the master member is in the tensioned position shown in FIG. 1. However, when the master member runs down from its tensioned position to its rest position, the change in position of the edge 29 of the master member allows the spring 27 to swing the lever 26 slightly in a counterclockwise direction on its pivot 25, so that the ear or lug 30 on the lever 26 lies behind or in the path of a projection 5 on the tube 1, as shown in FIG. 2. This prevents the tube 1 from being turned in a clockwise direction to aline the slots 4 with the stationary lugs 4A, as would be necessary in order to retract the tube to its rear position. But when the master member of the shutter is tensioned or cocked, the surface 29 of the master member, acting on the lug 28 of the lever 26, will swing the lever clockwise to remove the lug 30 from the path of the part 5, whereupon the tube 1 may be turned or twisted in a clockwise direction if it is desired to move it to its rear position. These parts thus furnish an interlock which insures that the tube can be in its retracted position only when the shutter is tensioned, as it is impossible to move the tube from its forward position to its rear position except when the master member is tensioned. It may be noted also that the positioning of the lug 30 in the path of the part 5 takes place close to the beginning of the running down movement of the master member, so that the twisting of the tube 1 is prevented not only when the master member is fully run down but also while it is in the process of running down.

The tube 1 (or a radial flange at one end of the tube) has a cam portion 6 (FIGS. 1 and 3) provided with an approximately radial slot 31, adapted for engagement with an ear or lug 32 on a latch lever 33 pivoted on a stationary pivot 33A in the camera body, and urged in a clockwise direction on such pivot by the spring 33B. When the tube is in the picture-taking position illustrated in FIGS. 1 and 2, the latch portion 32 is engaged in the notch 31 of the tube and prevents the tube from being turned or twisted in a clockwise direction. The latch may be released by pressing on a key portion or handle portion 34, manually accessible, to swing the latch lever 33 against the tension of the spring 33B and thus to remove the ear 32 from the notch 31. If at this time the master member is tensioned so that the latch portion 30 is out of the way of the tube portion 5, the tube can be turned in a clockwise direction and then may be moved rearwardly to its retracted position. But so long as either of the two latches 30 and 32 is in its effective latching position, the tube cannot be turned and thus cannot be moved rearwardly.

Figure 2:
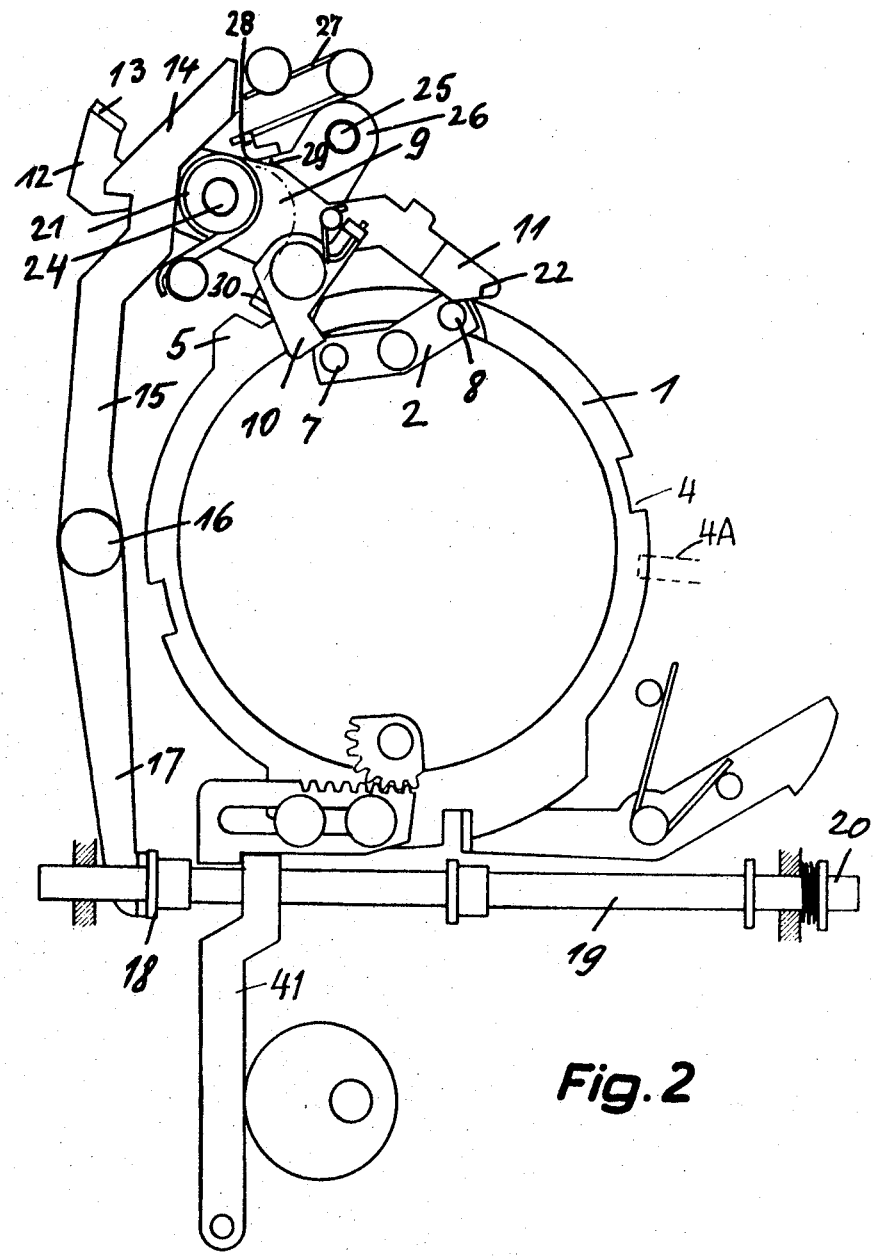
FIGURE 2 is a similar view showing the shutter driving parts in an intermediate running-down position, with the shutter blades open.
Figure 3:
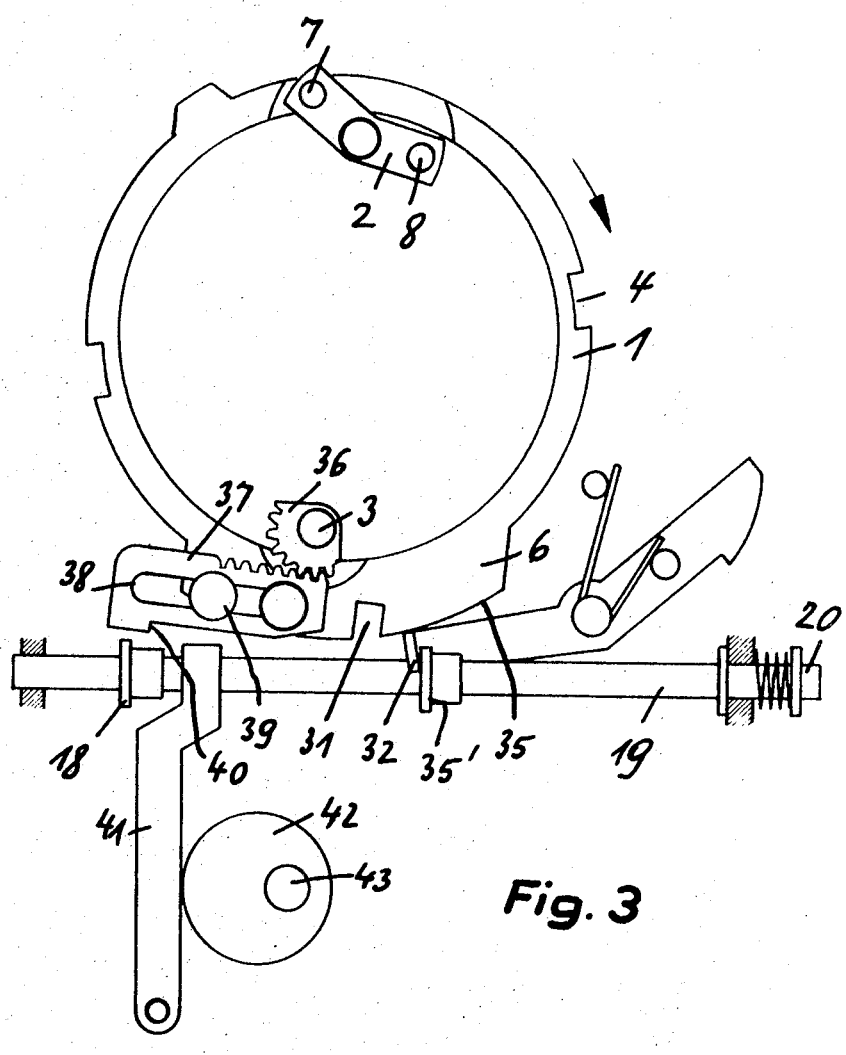
FIGURE 3 is a schematic view of some of the parts shown in FIGS. 1 and 2, with the tube partially twisted toward a position for retracting it.

The release plunger 19 is provided not only with the previously mentioned collar 18, but also with another collar 35' which lies just to the right of the latch ear 32, when the plunger 19 is in its normal rest position, as shown in FIG. 1. If the latch 33, 34 is released and the tube is then turned in order to move it rearwardly, the cam portion 35 on the tube engages the edge of the ear 32 and holds the latching lever 33 in its unlatched position, that is, unlatched with respect to the tube 1, but in this position it serves as a latch for the collar 35' of the plunger 19, as seen in FIG. 3, and prevents the plunger from being depressed. Thus the latch 32, 33, 34 is a double latch, having one position in which the tube is latched but the plunger 19 is unlatched, and another position in which the tube is unlatched but the plunger 19 is latched. This helps to provide a fool-proof construction so that the operator cannot accidentally press the release plunger to make an exposure when the tube carrying the lens, shutter, and diaphragm is not in proper position for such an exposure. Only when the tube is in its proper forward picture-taking position can the ear 32 of the latch drop into the notch 31, thereby releasing the latch from the collar 35' of the plunger 19. In all other positions of the tube 1 except the proper picture-taking position, the cam edge 35 of the tube will hold the latch parts 32, 33, 34 in the position shown in FIG. 3, to latch the plunger against actuation.

As already indicated, the diaphragm itself is of a well-known construction (for example, an iris diaphragm) and the leaves are moved to different aperture sizes by turning the diaphragm control member 3. This control member carries a toothed segment 36, as seen especially in FIGS. 1 and 3, which meshes with a rack slide 37 having guide slots 38 engaged by pins 39 mounted on a part of the structure of the tube 1, and moving bodily therewith. A spring (not shown) tends to move the diaphragm to one of its limit positions, that is, either fully open to the widest aperture, or closed down to the minimum aperture, whichever may be preferred.

The spring normally tends to move the slide member 37 in a direction toward the right when viewed as in FIGS. 1–3, so that the shoulder or edge 40 of the slide member 37 bears against the diaphragm control lever 41 pivoted in the camera body at 45, the position of the lever being determined by a cam disk 42 mounted on a rotary shaft 43 which shaft is controlled in any suitable known manner, such as being operated by a manually settable diaphragm control knob, or by automatic diaphragm exposure mechanism under the influence of an exposure meter, or in any other known way.

From what has been said it will be appreciated that the diaphragm mechanism mounted in or on the tube 1 is connected to the diaphragm control mechanism mounted in the camera body by means of the engagement of the slide 37 with the lever 41. Since the slide 37 is mounted on the pins 39 which are supported from and moved bodily with the tube 1, it will be seen by comparing FIG. 1 with FIG. 3 that as the tube is turned in a clockwise direction from the position in FIG. 1 to the position in FIG. 3, the slide 37 will move leftwardly on account of the rotary motion of the tube, and the abutment shoulder 40 on the slide will move away from the lever 41 and out of the range of this lever. Therefore the diaphragm parts on the tube are uncoupled from the diaphragm control parts on the camera body, automatically when the tube is made ready for moving rearwardly to its retracted position. When the tube is pulled forwardly again and rotated back in a counterclockwise direction to its properly latched position for taking pictures, the final part of the counterclockwise rotary motion of the tube 1 brings the slide member 37 back to a posttion where the shoulder 40 is aligned with the end of the lever 41, so that the dia- of the tube and minimizing the weight and size of the aperture is called for by the position which the lever 41 then occupies.

The construction above described is simple and economical, and is fool-proof on account of the interlocks which are provided. A minimum amount of structure is provided on the tube which carries the lens, shutter, and diaphragm, thus simplifying the construction of the tube and minimizing the weight and size of the tube. The shutter operating parts and the diaphragm control parts are mounted mainly on the camera body rather than on the axially shiftable tube, but are effectively coupled in a very simple manner to the parts on the tube which they are to operate or control, when the tube is moved from its retracted position to its picture-taking position. It may be noted that the driven parts on the tube are in cooperative relation to the driving or control parts on the camera body only when the tube is in picture-taking position. When the tube is retracted, the shutter operating lever 2 thereon is out of the range of the master member and the diaphragm operating slide 37 thereon is out of the range of the diaphragm control lever 41.

It has been mentioned above that constructions of this same general type, wherein the lens, shutter, and diaphragm are mounted on an axially movable tube, are well known in the art. Merely as examples of some of the known constructions, a knowledge of which may be helpful to readers of the present application, reference may be made to French Patent 900,548, and to the following United States patents, viz: 2,732,776, Jan. 31, 1956, Meixner; 2,865,273, Dec. 23, 1958, Meixner, et al.; 2,890,638, June 16, 1959, Rentschler.

It is seen from the foregoing disclosure that the objects and purposes of the invention are well fulfilled. It is to be understood that the disclosure is given by way of illustrative example only, rather than by way of limitation, and that without departing from the invention, the details may be varied within the scope of the appended claims.

What is claimed is:

1. A photographic camera of the type comprising a camera body and a lens tube axially movable with respect to said body from a forward picture taking position to a retracted position, said lens tube carrying shutter blades and diaphragm leaves bodily movable axially with the tube, characterized in that:

(a) a shutter driving member is mounted on said tube for bodily axial movement therewith;
(b) a shutter operating master member is mounted in fixed position on said camera body;
(c) said master member is movable through a running down movement from a tensioned position to a rest position;
(d) when said tube is in its picture taking position, said shutter driving member on said tube is in the range of travel of said master member so that as said master member performs its running down movement, it will engage said driving member and shift said driving member to open and close the shutter blades;
(e) when said tube is in its retracted position, said shutter driving member on said tube is out of the range of travel of said master member;
(f) said master member has two arms;
(g) said shutter driving member is a pivoted lever which has a first portion which lies in the path of travel of the first arm of said master member and a second portion which lies outside the path of travel of both arms of said master member, when the shutter blades are closed; and
(h) during running down movement of said master member, the first arm thereof engages said first portion of said driving member and swings said lever in one direction to open the shutter blades and to move the second portion of said driving member to a position in the path of travel of the second arm of said master member, and during continuance of said running down movement said second arm of said master member then engages said second portion of said driving member and swings said lever in an opposite direction to close the shutter blades and to move said first portion of said driving member back to a position in the path of travel of said first arm of said master member.

2. A construction as defined in claim 1, further characterized in that said first arm of said master member is in the form of a spring biased pivoted latch, formed to press unyieldingly against said first portion of said shutter driving member during running down movement of said master member and to yield so that it may slip past said first portion of said shutter driving member during tensioning movement of said master member in a reverse direction.

3. A construction as defined in claim 1, further characterized by a shutter release member movable to release said master member for running down movement from tensioned position to rest position, a manually operable latch member movable from a first position effective to latch the tube in its picture taking position to a second position effective to latch said shutter release member to prevent releasing movement thereof, and means effective to hold said latch member in its second position whenever the tube is moved from its picture taking position toward its retracted position, so that said shutter release member may not be actuated to release said master member except when the tube is in its picture taking position.

4. A construction as defined in claim 1, in which movement of said tube from picture taking position to retracted position involves an initial turning movement followed by axial movement thereof, further characterized by a shutter release member movable in a direction generally tangential with respect to the tube to release said master member for running down movement from tensioned position to rest position, a shoulder on the tube, a shoulder on said release member, a latch member movable from a first position lying in the path of said shoulder on the tube and out of the path of said shoulder on the release member, to a second position lying in the path of said shoulder on the release member and out of the path of said shoulder on the tube, and a surface on said tube for maintaining said latch member in said second position when the tube is moved away from its picture taking position, said latch member serving in its first position, to latch the tube against movement from picture taking position toward retracted position, and when said latch member is in its second position, it latches said shutter release member against actuation.

5. A construction as defined in claim 1, further comprising a shutter release member mounted on said camera body and movable to release said master member for running down movement to make an exposure, means controlled by the position of said master member for locking the tube against movement from picture taking position toward retracted position except when said master member is in its tensioned position, and interlocking means locking the tube against movement from picture taking position toward retracted position whenever said shutter release member is free for actuating movement and locking said shutter release member against actuating movement whenever the tube is not locked by said interlocking means, whereby the tube may be moved from picture taking position to retracted position only when the master member is in tensioned position and the shutter release member is locked against actuation.

6. A construction as defined in claim 1, further characterized in that:
  (i) a diaphragm aperture adjusting member is movably mounted on said tube and spring urged in one direction;
  (j) a diaphragm aperture control member is movably mounted on said camera body in position to engage said adjusting member when said tube is in picture taking position and to be out of engagement with said adjusting member when said tube is in retracted position;
  (k) movement of said tube from retracted position to picture taking position will move said adjusting member on the tube into engagement with said control member on the camera body and will cause said adjusting member to assume a position determined by the position of said control member; and
  (l) said aperture adjusting member on the tube is spring urged relative to the tube in a direction corresponding to the direction of a final part of the movement of the tube from retracted position to picture taking position, such final part of the movement of the tube serving to bring said adjusting member on the tube into engagement with said control member on the camera body so that said control member may stop further movement of said adjusting member while the tube continues its movement completely to picture taking position.

7. A construction as defined in claim 1, further characterized by locking means controlled by the position of said master member for locking said tube against movement from picture taking position to retracted position whenever said master member is in a position other than its tensioned position, and in which movement of said tube from picture taking position to retracted position involves an initial turning movement of the tube followed by axial movement thereof, and in which said locking means comprises an abutment shoulder on said tube, a locking lever pivotally mounted on the camera body, a spring tending to swing said locking lever to a position blocking said abutment shoulder to prevent said initial turning movement of the tube, and a cam edge on said master member for engaging said locking lever to swing said locking lever against the force of said spring to an ineffective non-blocking position with respect to said abutment shoulder, as said master member moves from rest position to tensioned position.

References Cited
UNITED STATES PATENTS 2,969,008   1/1961   Ferrari _____ 95—45 X JOHN M. HORAN, Primary Examiner